United States Patent [19]

Wells

[11] Patent Number: 4,547,546

[45] Date of Patent: Oct. 15, 1985

[54] ADDITIVE DISPERSIONS AND PROCESS FOR THEIR INCORPORATION WITH FIBER-FORMING POLYMER

[75] Inventor: Rodney L. Wells, Chester, Va.

[73] Assignee: Allied Corporation, Morris Township, Morris County, N.J.

[21] Appl. No.: 507,875

[22] Filed: Jun. 27, 1983

[51] Int. Cl.$^4$ .................. C08K 5/10; D06M 13/00; D06M 13/20

[52] U.S. Cl. .................. 524/313; 264/170; 264/211; 524/308; 524/601; 524/602

[58] Field of Search .................. 252/8.6, 8.8; 524/313, 524/601, 602, 308; 264/170, 211

[56] References Cited

U.S. PATENT DOCUMENTS

| | | | |
|---|---|---|---|
| 3,368,992 | 2/1968 | Altermatt | 524/601 |
| 4,356,280 | 10/1982 | Wells et al. | 524/148 |
| 4,443,573 | 4/1984 | Wells et al. | 524/308 |

FOREIGN PATENT DOCUMENTS 1268310  5/1968  Fed. Rep. of Germany ... 264/176 F

OTHER PUBLICATIONS

Excerpts of Technical Bulletins numbered 1-9.
1, Technical Bulletin Pigments No. 3, Degussa.
2, Technical Bulletin Pigments No. 23, Degussa.
3, Cab-O-Sil ® Properties and Functions, p. 17.
4, Cab-O-Sil ® in Coatings.
5, Hi-Sil ® 200 Series Silicas PPG.
6 & 7, Hi-Sil ® T-600 Silica Thickener PPG.
8, Lo-Vel ® 27 Silica Flatting Agent PPG.
9, Lo-Vel ® 275 Silica Flatting Agent PPG.
10, Millithix TM 925 Milliken Chemicals.

Primary Examiner—Ronald W. Griffin
Attorney, Agent, or Firm—Virginia S. Andrews; William H. Thrower

[57] ABSTRACT

A dispersion is provided for incorporation with a synthetic fiber-forming polymer. The dispersion comprises a polymer additive having an average diameter of up to 50 microns at a temperature of 25° C., a carrier, and a thickener selected from the group consisting of dibenzylidene sorbitol and silica having an ultimate particle size of 7 to 14 nanometers.

10 Claims, No Drawings

ADDITIVE DISPERSIONS AND PROCESS FOR THEIR INCORPORATION WITH FIBER-FORMING POLYMER

BACKGROUND OF THE INVENTION

The present invention relates to a dispersion for incorporation with a synthetic fiber-forming polymer and an improved process for melt-spinning yarn from a fiber-forming polymer. More particularly, the present invention relates to dispersions of polymer additives which are not readily available in submicron particle size and thus are not easily suspended in a liquid dispersion.

DESCRIPTION OF THE PRIOR ART

In spinning highly viscous synthetic polymers such as polyamides and polyesters, it is common to incorporate additives in order to obtain required characteristics of the final polymer for specific end uses. These additives can be incorporated in a variety of ways. See, e.g., U.S. Pat. No. 3,673,147 to Bor, hereby incorporated by reference. The continuous injection of a dispersion, comprising the additive in a carrier, into polymer melt prior to spinning is one such way. Discussion of various carriers for injection of additives may be found in U.S. Pat. Nos. 4,061,708 to Lazarus et al., 4,070,342 to Lazarus et al., and 4,356,280 to Wells et al., all of which are hereby incorporated by reference.

There are many additives useful for fiber property modification. Many of these additives are not readily available in submicron particle size and thus are not easily suspended in a liquid dispersion. The present invention was developed to improve the dispersion stability and thus shelf life of dispersions with such additives for injection into fiber-forming polymer.

SUMMARY OF THE INVENTION

The present invention provides a dispersion for incorporation with a synthetic fiber-forming polymer and an improved process for melt-spinning yarn from a fiber-forming polymer. The preferred fiber-forming polymers are synthetic linear condensation polymers, especially polyamide and polyester fibers, prepared, for example, in accordance with U.S. Pat. Nos. 2,130,523 (polyamide) and 2,465,319 to Whinfield et al. and 2,901,466 to Kibler et al. (polyester), all of which are hereby incorporated by reference.

The dispersion for incorporation with polyamide polymer comprises:
(a) 20 to 79.9, more preferably 40 to 69.75, weight percent of at least one polymer additive having an average diameter of up to 50 microns at a temperature of 25° C.;
(b) 20 to 79.9, more preferably 30 to 60, weight percent of a carrier selected from the group consisting of
 (i) a glyceride which is non-resin forming when exposed to temperatures of up to 280° C. and pressures of up to 4000 psig (27 600 kPa) for up to 30 seconds, and which has an average molecular weight of between about 600 and 2400, more preferably between 600 and 1200, and most preferably between 600 and 1000;
 (ii) a $C_5$–$C_{26}$, more preferably $C_5$–$C_{18}$, most preferably $C_8$–$C_{10}$ fatty acid ester of pentaerythritol (preferably the tetraester); and
 (iii) a $C_5$–$C_{26}$, more preferably $C_5$–$C_{18}$, most preferably $C_5$–$C_{10}$, fatty acid ester of dipentaerythritol (preferably the hexaester); and
(c) 0.1 to 2, more preferably 0.25 to 1.25, weight percent of a thickener selected from the group consisting of
 (i) dibenzylidene sorbitol; and
 (ii) silica having an ultimate particle size of 7 to 14 nanometers (nm). The most preferred polyamide is nylon 6.

The dispersion for incorporation with polyester polymer is identical to that recited above except that the glyceride is non-resin forming when exposed to temperatures of up to 320° C. and pressures of up to 4000 psig (27 600 kPa) for up to 60 seconds. The preferred polyester is polyethylene terephthalate.

For polyamide polymer, the spinning temperature preferably ranges for 255° to 285° C., whereas for polyester polymer the spinning temperature preferably ranges from 260° to 320° C.

The Brookfield viscosity of the dispersion at 25° C., 20 rpm, No. 4 spindle, ranges from 500 to 8000, more preferably from 2000 to 5000, centipoises.

While the polymer additive has an average diameter of up to 50 microns at a temperature of 25° C. (room temperature), it is preferred that the average diameter of the additives be 0.5 micron or less at spinning temperature. Thus, the additive may be solid at room temperature (25° C.) and liquid at spinning temperature. The longest measurable dimension of the particle while solid is its average diameter.

The additives may include such materials as pigments, flame retardants, stabilizers, antistats, etc. In this regard, see U.S. Pat. No. 4,356,280 to Wells et al. and U.S. Ser. No. 286,727, filed July 27, 1981, now abandoned, to Wells.

It is preferred that the dispersion further comprise about 0.25 to 2.5 percent, most preferably about 1 percent, based on the weight of the additive, of a compatible surfactant as disclosed in U.S. Pat. No. 4,356,280 to Wells et al.

The glyceride is preferably a di- or triglyceride derived by transesterifying a glyceride, preferably a natural glyceride, with a $C_6$–$C_{26}$, more preferably $C_6$–$C_{22}$, most preferably $C_6$–$C_{18}$, fatty acid ester of glycerol. Suitable natural glycerides include, for example, coconut oil, babassu oil, and palm kernel oil. See U.S. Pat. No. 3,785,973 to Bernholz, hereby incorporated by reference, for other examples of suitable glycerides. The most preferred glyceride is the triglyceride derived by transesterifying coconut oil (a natural triglyceride rich in $C_{12}$ lauric acid chain) with glycerol trioleate, rich in $C_{18}$ unsaturated oleic acid chain. The glyceride may be formed by alcoholysis, for example, using oleyl alcohol in the presence of an acid catalyst.

The present invention also provides improved processes for melt-spinning yarn from fiber-forming polyamide and polyester polymers. The process is comprised of adding to the specified polymer prior to spinning of filaments of the polymer the dispersions as set forth previously. The dispersion may be added to the polymer when the polymer is in chip form, e.g., at the extruder throat, or when the polymer is molten, e.g., at the barrel (vent port) of the extruder after final polymerization or polycondensation of the polymer.

The determination of carboxyl end groups and amine end groups of nylon 6 are made in accordance with the methods set forth in U.S. Pat. No. 4,356,280 to Wells et al.

In order to illustrate the present invention, the following examples are given.

EXAMPLE 1 (COMPARATIVE)

To a stainless steel beaker was added a mixture of 247.5 grams CAPLUBE 8370 (Capital City Products Company, glycerine ester of $C_6$–$C_{18}$ acids having average molecular weight 775, viscosity at 25° C., 30 rpm, No. 2 spindle of 48 cps, flash point of about 304° C., specific gravity at 15.6° C. of 0.905 to 0.920), 2.5 grams YELKIN DS (Ross and Rowe, Inc., a soybean lethicin of mixed phosphatidyl choline, phosphatidyl ethanolamine and phosphoinositides), 50 grams Santowhite Powder [Monsanto Corporation, 4,4'-butylidene-bis(6-tert-butyl-m-cresol)], 50 grams TINUVIN 234 (Ciba-Geigy, phenol, 2-(2 hydroxy-benzotriazol-2-yl)-4,6-bis(1-methyl-1-phenylethyl), and 150 grams titanium dioxide sold as UNITANE 0-310 (American Cyanamid Company, specific gravity 3.8, refractive index 2.55 and approximate pH 7.3 with aluminum oxide added.). The mixture was mixed at low speeds with an Eppenbach Homomixer and then mixed for 30 minutes at high shear conditions. The resulting dispersion had a viscosity of 2650 centipoises (hereafter cps) at 25° C. (Brookfield Viscometer Model RVF spindle No. 4 at 20 rpm). The dispersion when stored at 50° C. in an oven began to settle and show a clear liquid layer at the surface after one day. After six days the clear upper liquid was 6 millimeters deep. Average particle sizes for TINUVIN 234 and Santowhite Powder were 12 and 10.6 microns, respectively, based on measurements taken with a scanning electron microscope (using Martin's diameter).

EXAMPLES 2–12

The procedure of Example 1 was repeated with the dispersion compositions set forth in Table I. Stability of the dispersions is set forth in Table II. The clear layer at the top of the beaker was measured and recorded. The greater the depth the poorer the stability.

EXAMPLES 13–21

The procedure of Example 1 was repeated in each of Examples 13–21 with the dispersion compositions set forth in Table I. These examples correspond to Examples 2–10, respectively, except that the level of thickener was reduced to 0.5 weight percent from 1 weight percent based on the weight of the dispersion stability of the dispersions is set forth at Table II.

EXAMPLES 22–23

In Example 22, a mixture of 1000 grams of nylon chip characterized by 50 carboxyl ends (equivalents per $10^6$ grams polymer), 50 amine ends (equivalents per $10^6$ grams polymer) and 55 formic acid viscosity (ASTM-D-789-59T) was coated with 9.0 grams of a mixfture of 246.25 grams CAPLUBE 8370, 1.25 grams YELKIN DS, 50 grams Santowhite Powder, 50 grams TINUVIN 234 and 150 grams titanium dioxide. The coated chips were spun in a conventional one-inch melt extruder, using an asymmetric Y, 14-hole spinnerette at about 3 pounds per hour at 1000 feet per minute take-up. The yarns were drawn at a 3.2:1 draw ratio and steam jet textured.

Similarly, in Example 23 a mixture of 1000 grams of nylon chip characterized by 50 carboxyl ends (equivalents per $10^6$ grams polymer), 50 amine ends (equivalents per $10^6$ grams polymer), and 55 formic acid viscosity (ASTM-D-789-59T) were coated with 9.0 grams of a mixture of 243.75 grams CAPLUBE 8370, 1.25 grams YELKIN DS, 50 grams Santowhite Powder, 50 grams TINUVIN 234, 150 grams titanium dioxide and 5.0 grams AEROSIL ®380 (Degussa, silicon dioxide having average particle diameter 7 nanometers measured from electron micrographs). Brookfield viscosity was 4400 cps, spindle No. 4 at 20 rpm at 25° C. The coated chips were spun in a conventional one-inch melt extruder, using an asymmetric Y, 14-hole spinnerette at about 3 pounds per hour at 1000 feet per minute take-up. The yarns were also drawn at a 3.2.:1 draw ratio and steam jet textured. The yarn physicals were measured and appear in Table II. The yarns had comparable physical properties and no difficulty could be associated with the added silica.

EXAMPLE 24

The dispersion of Example 23 is utilized in the formation of polyester fiber. No difficulty is associated with the added silica.

EXAMPLES 25–26

The procedure of Example 4 is repeated in each of Examples 25 and 26 with the substitution, respectively, of ETHOX 2140 (Ethox Chemicals, Inc., pentaerythritol tetraester $C_8$–$C_{10}$ acids having a viscosity at 25° C., 30 rpm, No. 2 spindle of 48 cps, flashpoint of about 276° C., specific gravity at 15.6° C. of 0.936) and ETHOX 2143 (Ethox Chemicals, Inc., dipentaerythritol hexaester $C_5$–$C_{10}$ acids having a viscosity at 25° C., 30 rpm, No. 2 spindle of 81 cps, flash point of about 284° C., specific gravity at 15.6° C. of 1.01), for the CAPLUBE 8370 carrier. The dispersions produced have an acceptable shelf life.

This invention extends the range of additives which can be injected into nylon or polyester by extending shelf life of the dispersions incorporating the additives.

TABLE I

| | | DISPERSIONS | | | | | | | | | | | |
|---|---|---|---|---|---|---|---|---|---|---|---|---|---|
| | Particle | Example | | | | | | | | | | | |
| Additive (grams) | Size (nm) | 1 | 2 | 3 | 4 | 5 | 6 | 7 | 8 | 9 | 10 | 11 | 12 |
| CAPLUBE 8370 | — | 247.5 | 243.75 | 243.75 | 243.75 | 243.75 | 243.75 | 243.75 | 243.75 | 243.75 | 243.75 | 243.75 | 243.75 |
| YELKIN DS | — | 2.5 | 1.25 | 1.25 | 1.25 | 1.25 | 1.25 | 1.25 | 1.25 | 1.25 | 1.25 | 1.25 | 1.25 |
| TINUVIN 234 | — | 50.0 | 50.0 | 50.0 | 50.0 | 50.0 | 50.0 | 50.0 | 50.0 | 50.0 | 50.0 | 50.0 | 50.0 |
| Santowhite Powder | — | 50.0 | 50.0 | 50.0 | 50.0 | 50.0 | 50.0 | 50.0 | 50.0 | 50.0 | 50.0 | 50.0 | 50.0 |
| UNITANE 0-310 | — | 150.0 | 150.0 | 150.0 | 150.0 | 150.0 | 150.0 | 150.0 | 150.0 | 150.0 | 150.0 | 150.0 | 150.0 |
| AEROSIL ® 380 | 7 | — | 5.0 | — | — | — | — | — | — | — | — | — | — |
| Cab-O-Sil ® M-5[1] | 14 | — | — | 5.0 | — | — | — | — | — | — | — | — | — |
| Cab-O-Sil ® MS-7[1] | 14 | — | — | — | 5.0 | — | — | — | — | — | — | — | — |
| Hi-Sil ® 210[2] | 21 | — | — | — | — | 5.0 | — | — | — | — | — | — | — |
| Hi-Sil ® T-600[2] | 21 | — | — | — | — | — | 5.0 | — | — | — | — | — | — |
| Lo-Vel ® 27[3] | 21 | — | — | — | — | — | — | 5.0 | — | — | — | — | — |
| Lo-Vel ® 275[3] | 21 | — | — | — | — | — | — | — | 5.0 | — | — | — | — |

TABLE I-continued

DISPERSIONS

| | | | | | | | | | | | | | |
|---|---|---|---|---|---|---|---|---|---|---|---|---|---|
| AEROSIL ® 200[4] | 12 | — | — | — | — | — | — | — | — | 5.0 | — | — | — |
| AEROSIL ® 300[4] | 7 | — | — | — | — | — | — | — | — | — | 5.0 | — | — |
| AEROSIL ® R-972[4] | 16 | — | — | — | — | — | — | — | — | — | — | 5.0 | — |
| Millithix 925[5] | — | — | — | — | — | — | — | — | — | — | — | — | 5.0 |
| Viscosity[6] (cps) | — | 2650 | 4400 | 6050 | 5300 | 4100 | 4450 | 4250 | 4000 | 6350 | 7500 | 5300 | 6450 |

| | Particle Size (nm) | Example | | | | | | | | |
|---|---|---|---|---|---|---|---|---|---|---|
| Additive (grams) | | 13 | 14 | 15 | 16 | 17 | 18 | 19 | 20 | 21 |
| CAPLUBE 8370 | — | 246.25 | 246.25 | 246.25 | 246.25 | 246.25 | 246.25 | 246.25 | 246.25 | 246.25 |
| YELKIN DS | — | 1.25 | 1.25 | 1.25 | 1.25 | 1.25 | 1.25 | 1.25 | 1.25 | 1.25 |
| TINUVIN 234 | — | 50.0 | 50.0 | 50.0 | 50.0 | 50.0 | 50.0 | 50.0 | 50.0 | 50.0 |
| Santowhite Powder | — | 50.0 | 50.0 | 50.0 | 50.0 | 50.0 | 50.0 | 50.0 | 50.0 | 50.0 |
| UNITANE 0-310 | — | 150.0 | 150.0 | 150.0 | 150.0 | 150.0 | 150.0 | 150.0 | 150.0 | 150.0 |
| AEROSIL ® 380 | 7 | 2.5 | — | — | — | — | — | — | — | — |
| Cab-O-Sil ® M-5[1] | 14 | — | 2.5 | — | — | — | — | — | — | — |
| Cab-O-Sil ® MS-7[1] | 14 | — | — | 2.5 | — | — | — | — | — | — |
| Hi-Sil ® 210[2] | 21 | — | — | — | 2.5 | — | — | — | — | — |
| Hi-Sil ® T-600[2] | 21 | — | — | — | — | 2.5 | — | — | — | — |
| Lo-Vel ® 27[3] | 21 | — | — | — | — | — | 2.5 | — | — | — |
| Lo-Vel ® 275[3] | 21 | — | — | — | — | — | — | 2.5 | — | — |
| AEROSIL ® 200[4] | 12 | — | — | — | — | — | — | — | 2.5 | — |
| AEROSIL ® 300[4] | 7 | — | — | — | — | — | — | — | — | — |
| AEROSIL ® R-972[4] | 16 | — | — | — | — | — | — | — | — | 2.5 |
| Millithix 925[5] | — | — | — | — | — | — | — | — | — | — |
| Viscosity[6] (cps) | — | 3700 | — | — | — | — | — | — | 4750 | 5650 |

Table I Footnotes
[1]Cab-O-Sil ® of the Cabot Corporation is fumed silicon dioxide produced by the hydrolysis of silicon tetrachloride vapor in a flame of hydrogen and oxygen. Surface areas are measured by the nitrogen adsorption method of S. Brunauer, P. H. Emmet and T. Teeler, J. Am. Chem. Soc., 60, 309 (1938), and primary particle diameters are calculated from these, assuming spherical particles.
[2,3]Hi-Sil ® and Lo-Vel ®, both of PPG Industries, are amorphous silicas.
[4]AEROSIL ® of Degussa Corp. is produced by the hydrolysis of silicon tetrachloride in an oxygen-hydrogen flame. The silicon dioxide precipitates in the form of spherical, x-ray amorphous particles without notable internal surface area. The average primary particle size ranges from 7 to 40 nm.
[5]Millithix 925 of Milliken Chemical is dibenzylidene sorbitol.
[6]Brookfield Viscosity, 25° C., spindle #4, 20 rpm.

TABLE II

STABILITY

| | Depth of Clear Upper Layer (mm) | | | |
|---|---|---|---|---|
| Example | Day 1 | Day 2 | Day 3 | Day 6 |
| 1 | <1 | 2 | 3 | 6 |
| 2 | <1 | 1 | 2 | 2.5 |
| 3 | 1.2 | 1-1.2 | 2.5 | 3 |
| 4 | 1.2 | 1-1.2 | 2.0 | 1.5 |
| 5 | 2 | 2.5 | 2.5 | 3 |
| 6 | 1 | 2 | 2.5 | 4 |
| 7 | 1.5 | 2 | 2.5 | 3 |
| 8 | 1.5-2 | 2 | 2.5 | 4 |
| 9 | 1 | 1 | 2.0 | 3 |
| 10 | <1 | 1-1.2 | 1-1.2 | 1.5 |
| 11 | 1.5 | 2 | 2.5 | 2.5 |
| 12 | — | — | — | 1.5 |
| 13 | <1 | 1 | 2 | 2.5 |
| 14 | 1.2 | 1-1.2 | 2.5 | 3 |
| 15 | 1.2 | 1-1.2 | 2.0 | 2.0 |
| 16 | 2 | 2.5 | 2.5 | 3 |
| 17 | 1 | 2 | 2.5 | 4 |
| 18 | 1.5 | 2 | 2.5 | 3 |
| 19 | <2 | 2 | 2.5 | 4 |
| 20 | 1.5 | 2 | 2.5 | 3 |
| 21 | <1 | 1-1.2 | 1-1.2 | 1.5 |

TABLE III

YARN PHYSICALS

| Example | Modification Ratio | Denier | B.S. (lbs) | U.E. (%) | Tenacity (g/den) | Tensile Modulus (g/den) |
|---|---|---|---|---|---|---|
| 22 | 2.93 | 1121 | 8.8 | 65.4 | 3.6 | 32.9 |
| 23 | 2.89 | 1127 | 9.2 | 66.1 | 3.7 | 31.8 |

What is claimed is:

1. In a process for melt-spinning yarn from fiber-forming polyamide polymer, the improvement comprising: adding to the polymer, prior to spinning, a dispersion comprising:

(a) 20 to 79.9 weight percent of at least one polymer additive having an average diameter of up to 50 microns at a temperature of 25° C.;

(b) 20 to 79.9 weight percent of a carrier selected from the group consisting of
  (i) a glyceride which is non-resin forming when exposed to temperatures of up to 280° C. and pressures of up to 4000 psig (27 600 kPa) for up to 30 seconds, and which has an average molecular weight of between about 600 and 2400;
  (ii) a $C_5$–$C_{26}$ fatty acid ester of pentaerythritol; and
  (iii) a $C_5$–$C_{26}$ fatty acid ester of dipentaerythritol; and (c) 0.1 to 2 weight percent of a thickener selected from the group consisting of:
  (i) dibenzylidene sorbitol; and
  (ii) silica having an ultimate particle size of 7 to 14 nanometers (nm).

2. The process of claim 1 wherein the dispersion is added into the polymer when the polymer is in chip form.

3. The process of claim 1 wherein the dispersion is added into the polymer when the polymer is molten.

4. The process of claim 1 wherein the carrier forms 30 to 60 weight percent of the dispersion, the additive forms 40 to 69.75 weight percent of the dispersion, and the thickener forms 0.25 to 1.25 weight percent of the dispersion.

5. The process of claim 4 wherein the carrier is the glyceride formed by transesterification of coconut oil with glycerol trioleate, the thickener is silica having an ultimate particle size of 7 to 14 nm.

6. In a process for melt-spinning yarn from a fiber-forming polyester polymer, the improvement comprising: adding to the polymer, prior to spinning, a dispersion comprising:

(a) 20 to 79.9 weight percent of at least one polymer additive having an average diameter of up to 50 microns at a temperature of 25° C.;
(b) 20 to 79.9 weight percent of a carrier selected from the group consisting of:
(i) a glyceride which is non-resin forming when exposed to temperatures of up to 320° C. and pressures of up to 4000 psig (27 600 kPa) for up to 60 seconds, and which has an average molecular weight of between about 600 and 2400;
(ii) a $C_5$–$C_{26}$ fatty acid ester of pentaerythritol; and
(iii) a $C_5$–$C_{26}$ fatty acid ester of dipentaerythritol; and
(c) 0.1 to 2 weight percent of a thickener selected from the group consisting of:
(i) dibenzylidene sorbitol; and
(ii) silica having an ultimate particle size of 7 to 14 nanometers (nm).

7. The process of claim 6 wherein the dispersion is added into the polymer when the polymer is in chip form.

8. The process of claim 6 wherein the dispersion is added into the polymer when the polymer is molten.

9. The process of claim 6 wherein the carrier forms 30 to 60 weight percent of the dispersion, the additive forms 40 to 69.75 weight percent of the dispersion, and the thickener forms 0.25 to 1.25 weight percent of the dispersion.

10. The process of claim 9 wherein the carrier is the glyceride formed by transesterification of coconut oil with glycerol trioleate, the thickener is silica having an ultimate particle size of 7 to 14 nm.

* * * * *